United States Patent

Haavisto et al.

[11] Patent Number: 5,864,603
[45] Date of Patent: Jan. 26, 1999

[54] METHOD AND APPARATUS FOR CONTROLLING A TELEPHONE WITH VOICE COMMANDS

[75] Inventors: Petri J. Haavisto; Kari Laurila; Markku Majaniemi, all of Tampere, Finland

[73] Assignee: Nokia Mobile Phones Limited, Espoo, Finland

[21] Appl. No.: 651,865

[22] Filed: May 21, 1996

[30] Foreign Application Priority Data

Jun. 2, 1995 [FI] Finland ..................................... 952705

[51] Int. Cl.⁶ ..................................................... H04M 1/64
[52] U.S. Cl. ............................................... 379/88; 379/355
[58] Field of Search .................................. 379/67, 88, 89, 379/354, 355, 356, 357

[56] References Cited

U.S. PATENT DOCUMENTS

| | | | |
|---|---|---|---|
| 4,870,686 | 9/1989 | Gerson et al. | 381/43 |
| 4,928,302 | 5/1990 | Kaneuchi et al. | 379/88 |
| 4,945,570 | 7/1990 | Gerson et al. | 379/88 |
| 5,020,107 | 5/1991 | Rohani et al. | 381/43 |
| 5,042,063 | 8/1991 | Sakanishi et al. | 379/88 |
| 5,222,121 | 6/1993 | Shimada | 379/88 |
| 5,305,372 | 4/1994 | Tomiyori | 379/355 |
| 5,353,376 | 10/1994 | Oh et al. | 395/2.42 |

FOREIGN PATENT DOCUMENTS

| | | |
|---|---|---|
| 0 045 941 | 2/1982 | European Pat. Off. . |
| 0 194 387 | 9/1986 | European Pat. Off. . |
| 0 141 289 A3 | 12/1987 | European Pat. Off. . |
| 0 293 259 A3 | 11/1988 | European Pat. Off. . |
| 0293259 | 11/1988 | European Pat. Off. . |
| 0 618 710 A3 | 10/1994 | European Pat. Off. . |
| 8206928 | 6/1984 | Sweden . |
| 8701546 | 3/1987 | WIPO . |

OTHER PUBLICATIONS

"Sprachgesteuertes Telefon mit elektronischem Telefonregisterspeicher" NTZ Band 37 (1984) Heft 8 pages 496–499.

*Primary Examiner*—Fan S. Tsang
*Attorney, Agent, or Firm*—Perman & Green, LLP

[57] ABSTRACT

The invention includes a method and an apparatus for controlling a telephone, particularly a mobile telephone used in a cellular network. Advantageously the user interface of the telephone is voice-controlled, whereby dialling can be made without the use of hands e.g. when driving a car. In the method according to the invention, the task of a speech recognizer can be made easier using phone numbers in the phone's memory (102), ie. on the basis of a check command given by the user the phone selects the number to be recognized from among the numbers stored in its memory, whereby also an incorrect recognition can be automatically corrected.

33 Claims, 5 Drawing Sheets

METHOD AND APPARATUS FOR CONTROLLING A TELEPHONE WITH VOICE COMMANDS

BACKGROUND OF THE INVENTION

The invention is related to a method for controlling the operation of a telephone, especially a mobile telephone used in a cellular network. More particularly, the invention is related to a method for performing automatic check and correction in the set-up stage of a telephone connection. The example telephone apparatus to which the invention is applied will hereinafter be called a mobile phone, by which it is meant telephone apparatuses (e.g. a hand phone) in a cellular network. The invention as such is in no way limited to mobile phones but can as well be applied to telephones of the wire network.

The method according to the invention is related to the implementation of a user interface of a telephone apparatus, and hereinafter a user interface applying the method according to the invention is called the user interface according to the invention. It can be advantageously applied to telephone voice control, which below will be used as an example of implementation of the invention. However, the invention is not limited to voice-controlled user interfaces but it can also be used in user interfaces based on push-button commands.

Telephone voice control as such is not a new invention. When used in a car, a mobile phone often has to be capable of operating in the hands-free mode, for which there has to be in the car hands-free facilities including a separate microphone and a loudspeaker. A driver who speaks on the phone can use his or her both hands for driving the car during the call. The advantages of the hands-free operation are convenience and added safety. Because of the convenience of use the hands-free facility is also used as desktop hands-free installation in the office environment.

The practicability of the hands-free facility is affected by the fact that, when making a call, the number usually has to be dialled using the keypad user interface of the telephone. The same is true for answering the phone. A voice-controlled telephone eliminates this problem because the keypad user interface of the phone is not needed for making or answering a call.

In the prior art it is known several different ways of implementing a voice-controlled telephone user interface. These methods are disclosed e.g. in U.S. Pat. Nos. 5,222,121 and 4,928,302. Below it will be discussed prior art voice-controlled user interfaces mainly in general and some details of particular arrangements.

Two commonly used concepts related to the voice-controlled telephone user interface are digit dialling and repertory dialling. In repertory dialling, the user selects a phone number on the basis of a pre-recorded voice recording. The voice recording corresponds to a name associated with the phone number, whereby it is possible to select a number on the basis of the name of the owner of the number. The voice command can comprise one or more words, e.g. "John" or "John Smith".

Before a repertory dialling command the telephone has to be set into a mode where it knows to expect a name. This can be achieved either with a voice command or using the keypad of the phone. In a car installation, it is also possible to have an additional external control facility e.g. in the vicinity of the steering wheel, thus making it easy to activate the repertory dialling state.

An essential feature in the repertory dialling user interface is the training phase in which the user stores the names associated with the numbers as voice messages, or frequency and time coded signals, in the telephone's memory. Depending on the implementation of the user interface the user may have to repeat a name more than once to make a reliable recording for speech recognition. In the recognition phase, the phone compares the spoken name command to all the recordings and, on the basis of a statistical comparison, selects the voice recording that best matches the command.

Since there may always occur an error in the recognition, the phone usually verifies the recognized name in some way. Usually this is done by reproducing the recognized voice recording and requiring user verification. As the phone has reproduced the voice recording that it has found on the basis of the recognition, it expects the user to give an affirmative or negative answer. If the recognition was correct, the user says e.g. "yes", whereby the phone begins to set up the connection. If, on the other hand, the recognition was incorrect, the user says e.g. "no", whereby a prior art telephone usually returns to the initial state of the repertory dialling. To this method of operation it is known an improvement disclosed in U.S. Pat. No. 4,928,302 in which the user does not have to verify a correct recognition with an affirmative answer like "yes", since the phone, having reproduced the recording that it has found as a result of the recognition, either immediately or after a short delay starts to set up the connection. If the recognition was incorrect, the user may cancel the call during said delay or even during call set-up. In addition, it is known from U.S. Pat. No. 5,222,121 an improvement to the method discussed in which the telephone selects in the recognition several recognition results and reproduces first the result that best matches the recognition. If the user gives a negative answer to this reproduction, the phone selects the result that is the second best match to the recognition. In the primary claim of U.S. Pat. No. 5,222,121 this function is generalized so that as a response to each repetition of a particular voice command the telephone indicates as voice reproduction and/or on the display the next best candidate, when the candidates have been arranged in order.

In digit dialling the user selects a phone number using a voice command comprising a series of digits. In other words, the number is spoken to the phone, which recognizes the series of digits and sets up a connection to the telephone number it recognized. Before uttering the phone number, the phone has to be set into a mode where it knows to expect a number. This can be achieved either with a voice command or using the push buttons on the telephone's keypad. In a car installation, it is also possible to have an additional external control facility e.g. in the vicinity of the steering wheel, thus making it easy to activate the digit dialling state.

Since not all telephone numbers are equally long, the user has to end the series of digits with a command word (e.g. "dial") to inform the telephone that the number contains no more digits. In principle, the telephone could conclude it from the silence that follows the uttering of digits, but such a method results in delay and uncertainty, especially in a noisy environment. Indeed, in the prior art it is used exclusively methods with a command word ending the number. So, a digit dialling command could be e.g. "nine three one two two three two three four three dial".

Voice-controlled phones using digit dialling differ from each other significantly. In the most widely used method the digits have to be uttered separately with a short pause between the individual digits. Such a recognition method is called isolated word recognition. Another method is to utter the whole sequence of digits without pauses; such a method is called connected word recognition. For the speech recognition unit of a phone the recognition of individual digits is much easier than of whole digit sequences in which the transition points between individual digits are unknown. For the user, however, uttering connected digits is the more natural way of selecting phone numbers.

In prior art user interfaces based on digit dialling the most important factor affecting the correct recognition of a phone number is the probability of a correct recognition by the phone of an individual digit. The effect of this probability can be illustrated by the following example: Let us assume that a user dictates a completely random nine-digit telephone number and let us further assume that the speech recognition unit in the phone operates purely on a guessing basis, whereby the probability of recognizing an individual digit correctly is 0.1. The probability for that the phone recognizes the whole nine-digit sequence correctly is $(0.1)^9 = 10^{-9}$, or one in a billion. Even if the speech recognition unit were improved so that the probability of a correct recognition of an individual digit would be 0.8, or 80%, the probability of a correct recognition of the whole nine-digit sequence would still be a modest 13% ($0.8^9 \approx 0.134$).

From the user's point of view, it is frustrating if a voice-controlled phone recognizes correctly every seventh phone number on the average. A similar problem may arise in connection with a user interface based on push-button commands, especially with forgetful or clumsy users: although the phone recognizes the push-button commands with a 100% probability, the user may misremember the phone number or the corresponding alphanumeric character sequence or he or she may push a wrong button.

SUMMARY OF THE INVENTION

It is an object of this invention to improve the convenience of use of the telephone. It is also an object of the invention to improve reliability and speed of dialling. It is a further object of the invention to improve the probability of recognizing a phone number correctly in a voice-controlled user interface. A yet further object of the invention is to correct user-made errors when setting up a telephone connection.

These objects of the invention are achieved with a function in which the user may define a certain number of all possible called party candidates as the fundamental set for the recognition by the phone.

It is characteristic of the method according to the invention for controlling a telephone apparatus, which includes a control unit and storage means, that in it the user delivers a check command to said telephone apparatus and as a response to said check command said control unit compares the character sequence provided by the user to corresponding character sequences stored in said storage means and selects for telephone connection set-up that character sequence among the compared character sequences stored in said storage means which best matches said character sequence provided by the user.

It is characteristic of the telephone apparatus according to the invention which includes a control unit and storage means that it also includes means for delivering a check command from the user to said control unit, means for comparing a character sequence provided by the user to corresponding character sequences stored in said storage means as a response to said check command, and means for selecting for telephone connection set-up that character sequence among the compared character sequences stored in said storage means which best matches the character sequence delivered from the user to the telephone apparatus.

The recognition of a phone number is considerably easier if the phone number delivered to the phone belongs to a predetermined, relatively small set. This is illustrated by the following example: Let us assume that the user of a voice-controlled user interface knows that the nine-digit phone number that he dictated is one of a hundred stored in the phone's memory. By phone numbers in the memory or stored in the memory we mean all those phone numbers that in some way or another are known to the telephone and which can be processed by the electric unit controlling the operation of the phone. Having dictated the number the user indicates to the phone that the phone numbers stored in the memory are to be used as the fundamental set for the recognition. Even if the recognition were based on pure guessing, the probability of a correct recognition has already improved to $1/100 = 10^{-2}$, or ten million times better than for the recognition of a general character sequence. With an advanced recognition algorithm and using the phone numbers in the memory as a fundamental set the probability of correct recognition can be considerably improved.

Similarly, in a telephone user interface in which the user selects the called party by delivering to the phone a phone number or corresponding alphanumeric character sequence, a small error such as one character can be corrected. In the operation according to the invention, the user indicates to the phone that it should perform the recognition for the character sequence entered by the user using the fundamental set of character sequences stored in the memory, and the phone searches from the memory the character sequence which best matches the character sequence delivered by the user.

When the telephone has recognized the intended called party number and has reproduced it either by speaking or on the display for checking, the user may, if he or she notices an error, give a separate command (e.g. "check") after which the phone compares the recognized incorrect number to all numbers in its memory and selects the number in the memory that best matches the recognized incorrect number.

In another version of the same method the user may, already when dictating a number to be dialled, end the digit sequence with a separate command (e.g. "check"), on the basis of which the phone will know that that particular number is already in the phone's memory. When performing recognition, the phone will not even consider numbers that are not stored in its memory, thus diminishing the possibility of recognition error.

BRIEF DESCRIPTION OF THE DRAWING

The operation of a telephone apparatus using a user interface according to the invention is below described in detail by means of an example and with reference to the accompanying drawings in which.

DETAILED DESCRIPTION OF THE INVENTION

To illustrate the background of the invention it is below first described the operation of a voice-controlled telephone user interface according to the prior art, referring to FIGS. 1 to 3 and 5. The user interface is depicted using a hierarchical state diagram presentation. Each individual state is represented by a rectangle containing in its shadowed upper part a name identifying the state. If a particular state name appears in different figures or in different locations of one figure, it refers to one and the same state. The white lower part of the rectangle often contains a code, which corresponds to the telephone dialog. Upon entering such a state, the phone speaks the dialog corresponding to the code. If no code is shown, the phone remains silent upon entering the state in question. The coding of the telephone's dialogs is shown in Table 1.

State transitions are depicted by arrows and associated circles. If the circle is white, transition occurs directly due to user dialog. The code inside a circle indicates the user dialog related to the transition. Let it be pointed out, however, that a transition occurs only when the phone recognizes the user dialog correctly. In that case, the phone makes a state transition decision based on the conclusion about the user dialog. The coding of the user dialogs is shown in Table 2. If a circle is shadowed, the transition is not based on a user dialog. The code inside the circle indicates the condition on which the transition occurs. The other transition conditions are shown in Table 3.

The figures also show states and transitions which are irrelevant to the invention and which are not referred to in the description below but which are shown as an indication of how the functions according to the invention relate to other functions of the phone.

Figure 1:
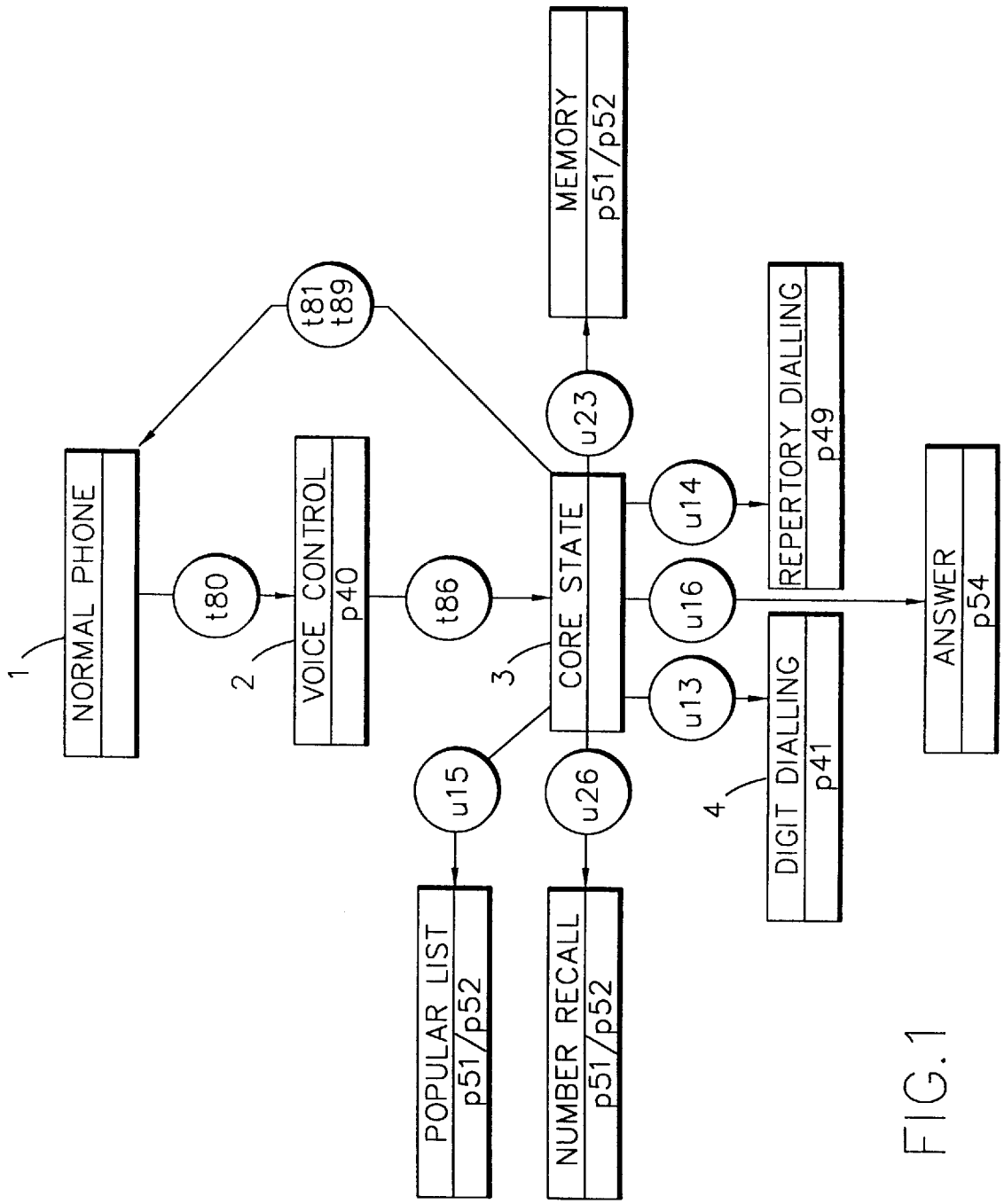
FIG. 1 is a state diagram illustrating the highest hierarchy level in the operation of a voice-controlled telephone user interface according to the prior art.
Figure 2:
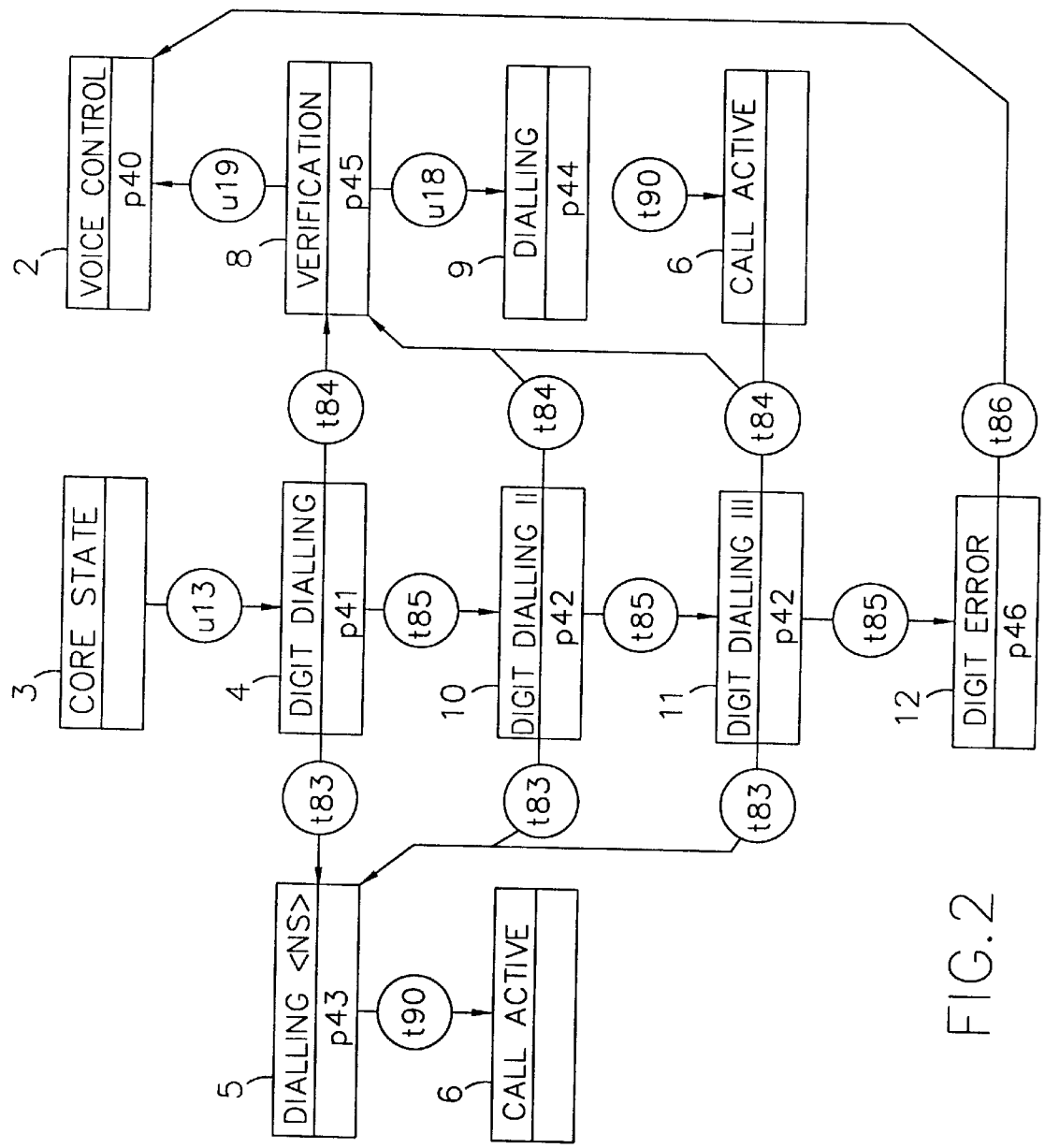
FIG. 2 is a state diagram illustrating the prior art operation of a voice-controlled telephone user interface in digit dialling.

FIG. 1 shows the highest hierarchy level of the user interface. Initially the telephone is in state Normal phone 1. In this state the phone operates as a normal mobile phone and it cannot be controlled with voice commands. To make the use of voice commands possible the phone has to be first set into the appropriate mode. This is achieved through push-button sequence no. 1 making the phone enter state Voice control 2. In state Voice control 2, the phone responds "Voice control active", after which it immediately enters state Core state 3. Core state 3 is the basic state of the voice-controlled user interface, ie. the state into which the phone always returns e.g. after a call has terminated or after certain other actions. In Core state 3, the user may start various actions by means of voice commands. With the command "Dial by number" the user can initiate a call using a voice command containing a sequence of digits. Such an operation is illustrated in FIG. 2.

First the command "Dial by number" causes transition to state Digit dialling 4. When entering this state, the phone answers "Number, please". The user can now say the whole phone number ending it with the command "dial", e.g. "nine three one three one six five eight seven six dial". Then follows one of three possible state transitions depending on how successful the recognition was.

Figure 3:
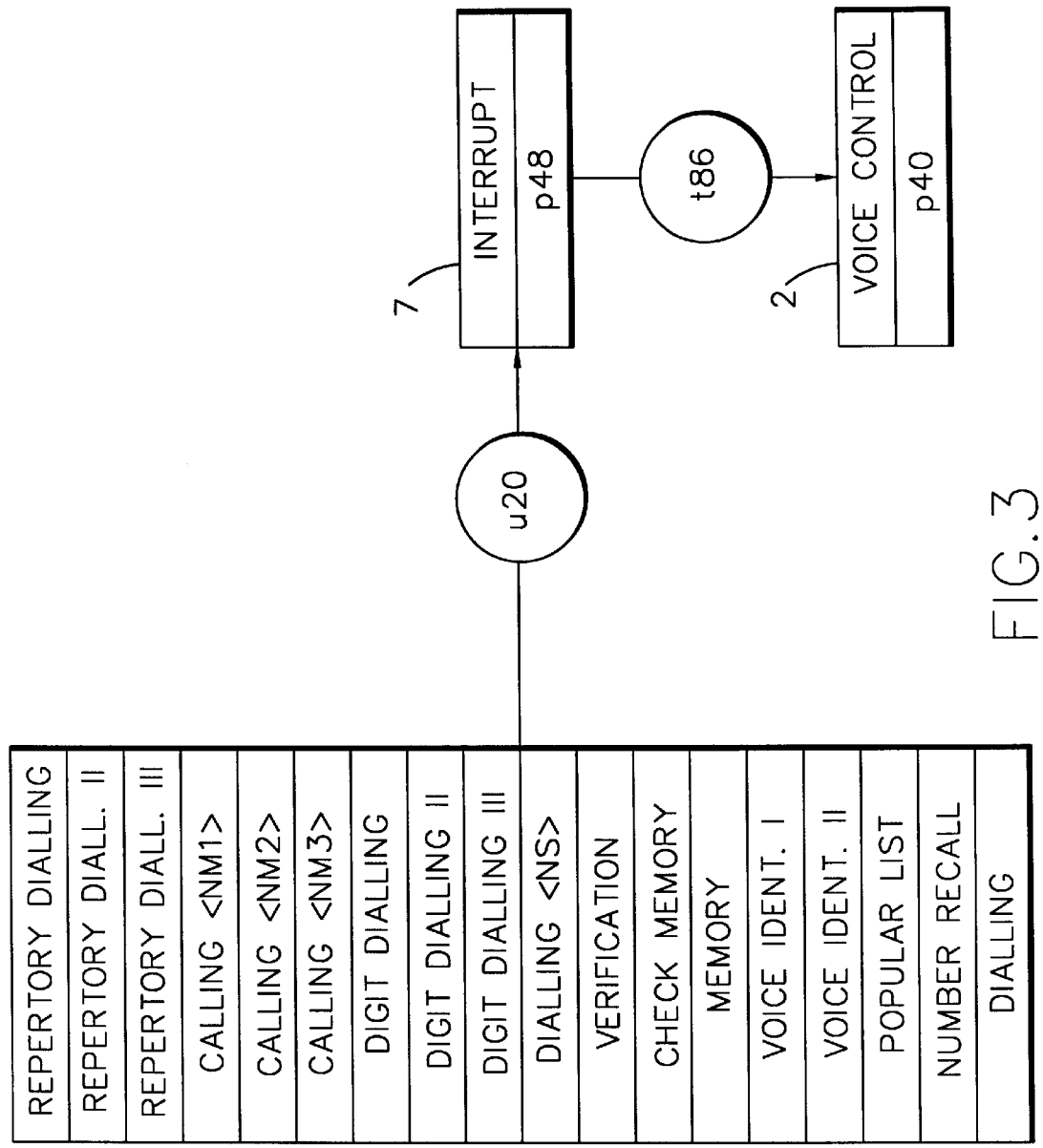
FIG. 3 is a state diagram illustrating the transition of a voice-controlled telephone apparatus via the interrupt state to the basic state according to a known principle.

If the recognition was considered certain, the telephone goes into state Dialling <NS>5. Upon entering this state the phone responds "Dialling" and then reproduces the sequence of recognized digits. If the user does not answer with the command "Cancel", the call will be established. In conventional methods, the user is prompted for verification of the recognized number, but in the more advanced user interface according to U.S. Pat. No. 5,222,121 discussed above that is not necessary if the recognition was successful. The user still has time to cancel the call if the recognition failed. When the called party picks up the receiver, the phone enters state Call active 6, in which voice commands are not active. If, however, the user says "Cancel", the call will not be established, but the phone will go, as shown in FIG. 3, into state Interrupt 7, whereupon the phone will respond "Operation interrupted". This is followed by an immediate transition to state Voice control 2, whereupon the phone will respond "Voice control active". This is further followed by an immediate transition to the basic state of the voice-controlled user interface, ie. Core state 3. Use of the "Cancel" command is shown in FIG. 3, which lists on the left-hand side all the states in which the "Cancel" command may be used. The sequence of actions invoked by the command is always the same. Let it be pointed out that the "Cancel" command can be used in almost all situations.

Figure 5:
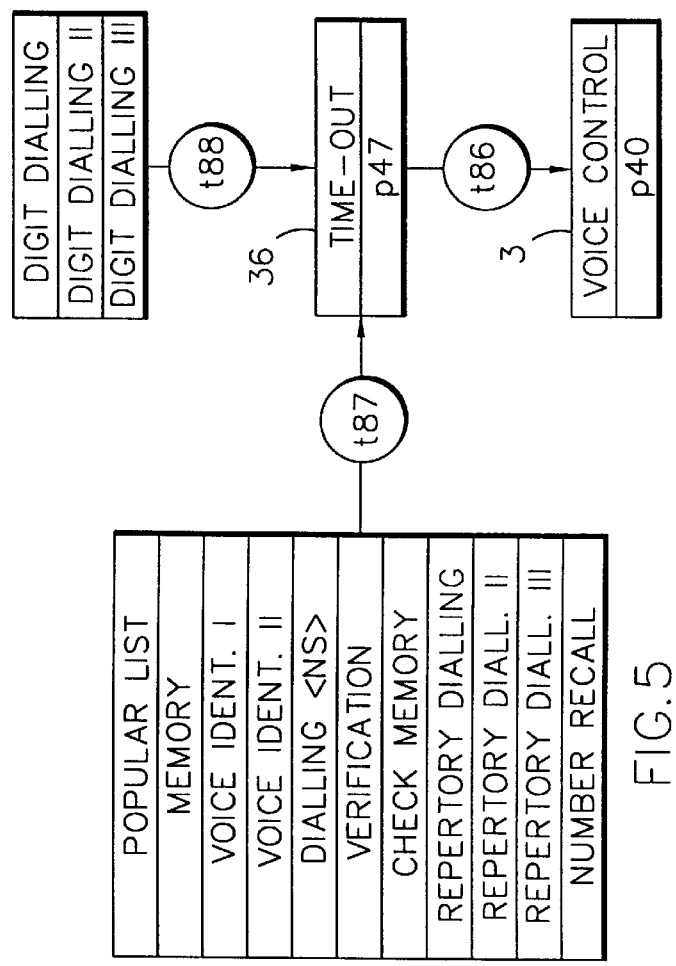
FIG. 5 is a state diagram illustrating the transition of a voice-controlled telephone apparatus via a delay to the basic state according to a known principle.

FIGS. 3 and 5 also show state Check memory 35 which belongs to the user interface arrangement according to the invention; its use will be described later.

If the recognition was considered uncertain, state Digit dialling 4 is followed, as shown in FIG. 2, by state Verification 8. Upon entering this state the phone responds "Was the number" and then lists the recognized sequence of digits. In this way the user is let to know that there may have occurred an error in the phone number recognition. So the user must pay special attention when listening to the recognized sequence of digits. Having listened to the phone's response the user may answer either "Yes" or "No". If the user answers "Yes", there follows a transition to state Dialling 9. Upon entering this state the phone responds "Dialling" and the call will be established. Again, the user may interrupt the action by saying "Cancel" before the called party picks up the receiver. If the user in state Verification 8 answers "No", the phone will go into state Voice control 2, wherefrom it will continue as described above.

If the recognition failed, the phone will go into state Digit dialling II 10. Then the phone will respond "Number again, please". States Digit dialling II 10 and Digit dialling 4 are identical, except for the case of failed recognition. In the case of failed recognition, state Digit dialling II 10 is followed by state Digit dialling III 11. Upon entering state Digit dialling III 11 the phone responds "Number again, please". States Digit dialling III 11 and Digit dialling II 10 are identical except for the case of failed recognition. In the case of failed recognition, state Digit dialling III 11 is followed by state Digit error 12. Upon entering state Digit error 12 the phone responds "Unable to recognize number", followed by an immediate transition to state Voice control 2.

Many of the states have time-out limits, and when these limits are exceeded the phone automatically enters the basic state of the voice-controlled user interface, ie. Core state 3. This operation is illustrated in FIG. 5. The transition occurs via state Time-out 36. Upon entering state Time-out 36 the phone responds "Time-out", followed by an immediate transition to state Voice control 2.

In FIG. 5, on the left-hand side, it is listed the states that have a maximum time-out limit of 5 seconds. The time-out limit is considered exceeded if the user has not uttered a command (or an identifier to be stored) in 5 seconds. In the upper part of FIG. 5 it is listed the states that have a maximum time-out limit of ten seconds. If the user has not in ten seconds started the dialog, the time-out limit is considered exceeded.

Return from the basic state of the voice-controlled user interface, ie. Core state 3, to telephone operation without voice control (state Normal phone 1) can occur either through the push-button sequence no. 2 or when an adjustable maximum time-out limit is exceeded. The transition is shown in FIG. 1.

It is known that correcting a phone number afterwards using a series of voice commands is very laborious. Indeed, it has been considered so laborious that such a procedure has not been included in the user interface. On the other hand, it would be quite easy to correct a phone number using only one voice command. This invention makes possible such an operation. Next, we will discuss correction of a phone number according to the invention with reference to FIG. 4.

Figure 4:
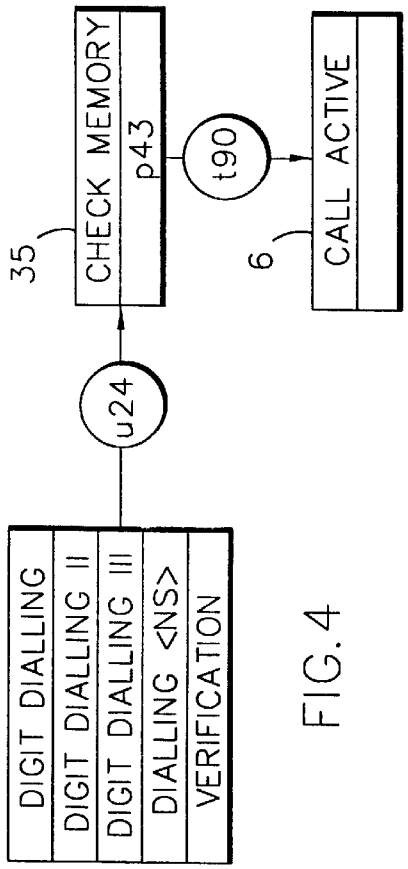
FIG. 4 is a state diagram illustrating the operation of a voice-controlled telephone user interface concerning the improvement according to the invention, ie. the improvement of the phone number recognition probability.

FIG. 4 is a a state diagram illustrating phone number correction. The correction can be done in two different ways. In the first way, the user indicates already when making the call that the phone should search the memory for a digit sequence that best matches the phone number provided by the user. In other words, the recognized digit sequence is replaced with a best matching digit sequence found from the memory. This is done, if the user in states Digit dialling 4, Digit dialling II 10 and Digit dialling III 11 ends the digit sequence with command "Check" instead of command "Dial". After command "Check" there follows a transition to state Check memory 35 whereupon the phone responds "Dialling" and lists the digit sequence found from the memory. If, after that, the user does not respond with command "Cancel", the call will be established. The purpose of this function is to make the phone's recognition task easier, thus improving the probability of finding the correct phone number.

We can also consider a case in which the user remembers that the phone number is 931-1234 567 but is not quite certain whether he or she remembers it correctly. The user then issues a voice command "Nine three one one two three four five six seven check". After the "Check" command there follows a transition to state Check memory 35 whereupon the phone responds "Dialling" and lists the digit sequence found from the memory. If the phone did not find the number provided by the user, but did find e.g. 931-1233 567, it responds with dialog "Dialling nine three one one two three three five six seven". If the user then does not respond with "Cancel", the call will be established.

In the second way, the user may use the "Check" command also in states Dialling <NS>5 and Verification 8, whereby the recognized and reproduced digit sequence is replaced with a best matching digit sequence found from the memory. The "Check" command causes transition to state Check memory 35, and the procedure goes on as described above.

The voice-controlled telephone user interface described above is two-directional, ie. voice commands can be given to the phone and the phone responds to the commands with answers. These answers may be voice answers, in which case they are generated by a speech synthesizer, or they may be recorded in the phone's memory in advance. Advantageously, a voice coding method may be used in storing the voice answers to reduce the amount of memory required by the recording. The phone may also give the answers using another indication method known in the art, such as a display device or a signal tone.

The method according to the invention may also be applied in a one-directional user interface in which the user receives from the phone no information concerning the dialling procedure. If such a phone selects instead of the phone number provided by the user the number in the memory that best matches it, it is only after the call has been established that the user will know for sure which number he or she has called.

In the user interface according to the invention it can be used either connected word recognition or isolated word recognition or both.

It is essential to the invention that a phone employing the user interface according to the invention includes a memory into which phone numbers are stored. By phone numbers it is meant all characters or character sequences that are used for identifying the called party in the call set-up phase. This memory may be implemented in many ways: the memory may be arranged to resemble a phonebook, in which case the user himself or herself separately stores the numbers in it. The memory may also operate automatically so that the phone stores in the memory numbers to which a successful call has been made. Both memory types can also be used in parallel. The memory may be fully independent of the voice recording memory used in connection with the voice-controlled dialling.

In the examples above it was used one check command "check", on the basis of which the phone compares the phone number provided by the user to all phone numbers in the memory. A second embodiment of the invention uses more user-issued commands for the same purpose. It is known that a telephone apparatus maintains in its memory a list of the most popular, or most frequently used, phone numbers, ie. a list in which the first phone number is the number that has been used most often, followed by other numbers arranged in an order based on the frequency of their use. According to the invention, the user can instead of the command "check" issue e.g. the command "my numbers", whereby the phone will use as the fundamental set for recognition only the ten most popular phone numbers. Similarly, the command "last numbers" instead of "check" may cause the phone to use as the fundamental set for recognition only a certain number of most recently used phone numbers. Corresponding restrictions to the fundamental set can be made in many ways.

Figure 6:
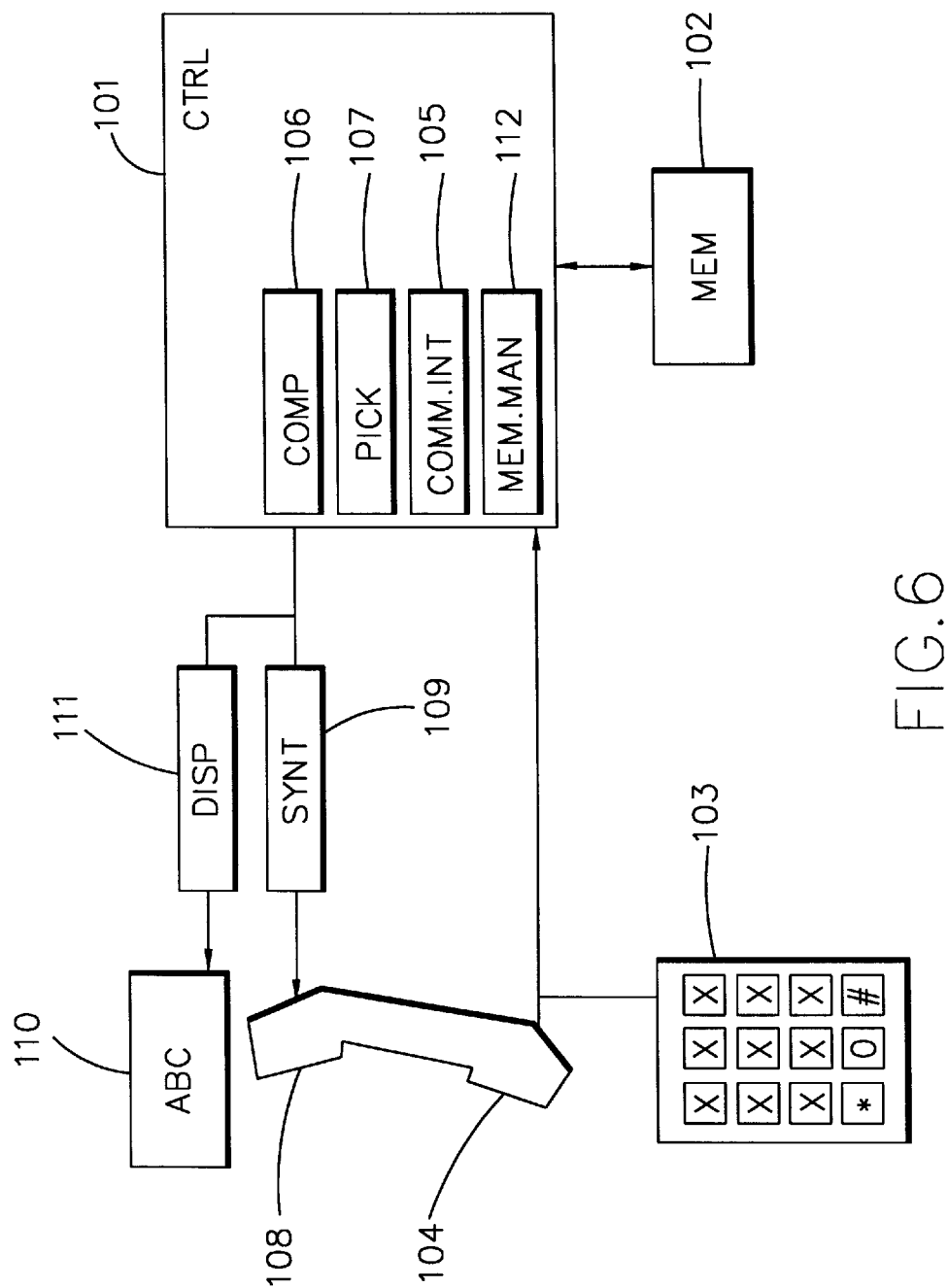
FIG. 6 is a block diagram of a telephone apparatus in which it is possible to use the phone according to the invention.

Above it has been discussed the method according to the invention and a user interface for a telephone apparatus employing the method according to the invention. According to the claims set forth later, the invention is also related to a telephone apparatus employing the method according to the invention. A simplified block diagram of the telephone apparatus is shown in FIG. 6. It includes a control block CTRL 101, which controls the operation of the telephone apparatus, and a memory block MEM 102, into which phone numbers, voice recordings and alphanumeric character sequences can be stored. The user delivers commands and character sequences to the telephone apparatus as speech through a microphone 104 or as push-button commands through the keypad 103. To recognize the commands the telephone apparatus includes a command interpreter block COMM.INT 105. For comparing character sequences and selecting the correct character sequence in the way according to the invention the telephone apparatus includes a comparison block COMP 106 and a selection block PICK 107. The command interpreter, comparison and selection blocks 105 to 107 and a memory management block MEM-.MAN 112, which stores phone numbers in memory and reads them from memory, are advantageously implemented as part of the control block 101. To produce voice signals the telephone apparatus includes a speech synthesizer SYNT 109 and a loudspeaker 108. To produce display signals the telephone apparatus includes a display driver block DISP 111 and a display 110.

By means of the invention the reliability of dialling based on voice recognition is improved and the user interface is made more user-friendly. With the invention, new user-friendly features can be introduced also in the use of a user interface based on push-button commands.

TABLE 1

Coding of telephone's dialogs.

| | | | |
|---|---|---|---|
| "Voice control active" | p40 | "Number, please" | p41 |
| "Number again, please" | p42 | "Dialling" + NS* | p43 |
| "Dialling" | p44 | "Was the number" + NS* | p45 |
| "Unable to recognize number" | p46 | "Time-out" | p47 |
| "Operation interrupted" | p48 | "Name, please" | p49 |
| "Calling" + NM* | p50 | NS* | p51 |
| NM** | p52 | "Unable to recognize name" | p53 |
| "Line open" | p54 | "Error in saving" | p55 |
| "Save completed" | p56 | "Too similar with" + NM** | p57 |
| "Name again, please" | p58 | | |

*NS refers to saying a phone number
**NM refers to saying a name.

TABLE 2

Coding of user's dialogs.

| | | | |
|---|---|---|---|
| numbers and corresponding words | u0–12 | "Dial by number" | u13 |
| "Call by name" | u14 | "My numbers" | u15 |
| "Answer" | u16 | "Dial" | u17 |
| "Yes" | u18 | "No" | u19 |
| "Cancel" | u20 | "Next" | u21 |
| "Previous" | u22 | "Memory" | u23 |
| "Check" | u24 | "Save" | u25 |
| "Last numbers" | u26 | | |

TABLE 3

Coding of other transition conditions.

| | | | |
|---|---|---|---|
| Push-button sequence no. 1 | t80 | Push-button sequence no. 2 | t81 |
| Hang-up button pressed | t82 | Successful recognition | t83 |
| Uncertain recognition | t84 | Failed recognition | t85 |
| Immediate transition | t86 | End with delay, 5 s | t87 |
| End with delay, 10 s | t88 | End with delay, 5 min (adjus.) | t89 |
| Connection OK | t90 | Similar to another voice ident. | t91 |
| Accepted training identifier | t92 | Rejected training identifier | t93 |

What is claimed is:

1. A method for controlling a telephone apparatus which includes:
    a control unit controlling its operation,
    storage means for storing telephone numbers as stored character sequences, and
    means for delivering commands given by the user to said control unit, in which the user provides a calling character sequence to said telephone apparatus to identify an intended called party, the method comprising steps of:
    storing a predetermined number of character sequences in said storage means;
    entering a calling character sequence upon an entry command of the user;
    initiating a recognition procedure wherein, in said recognition procedure, said control unit compares said character sequence to corresponding character sequences stored in said storage means, and selects for telephone connection establishment that character sequence among the compared character sequences stored in said storage means which best matches said character sequence delivered from the user to the telephone apparatus; and
    upon the presence of an error and in response to a user check command, comparing a recognized incorrect number to all numbers in said storage means, and selecting a number in said storage means that best matches the recognized incorrect number.

2. The method of claim 1, wherein the user gives said character sequence, which is delivered to the telephone apparatus, as a voice command.

3. The method of claim 2, wherein said character sequence is a phone number, which the user speaks as a continuous digit sequence.

4. The method of claim 2, wherein said character sequence is a phone number, which the user speaks as separate digits pausing between individual digits.

5. The method of claim 1, wherein the user gives said character sequence, which is delivered from the user to the telephone apparatus, as a push-button command.

6. The method of claim 1, wherein said telephone apparatus includes indication means (108, 109, 110, 111) to provide the user with information related to call establishment and indicates to the user after said comparison which one of the character sequences stored in said storage means was selected for call establishment.

7. The method of claim 6, wherein said telephone apparatus produces said indication as voice indication.

8. The method of claim 6, wherein said telephone apparatus produces said indication as display indication.

9. The method of claim 1, wherein the user delivers said check command to said telephone apparatus before it begins establishing the telephone connection.

10. The method of claim 1, wherein the user delivers said check command to said telephone apparatus after it has begun establishing the telephone connection.

11. The method of claim 1, wherein said telephone apparatus also automatically stores a phone number in said storage means when said telephone apparatus has a telephone connection to a telephone apparatus identified by the phone number in question.

12. The method of claim 1, wherein the user also stores phone numbers in said storage means when no call is made through said telephone apparatus to the number in question.

13. The method of claim 1, wherein in that as a response to said check command said control unit compares said character sequence provided by the user to all said corresponding character sequences stored in said storage means.

14. The method of claim 1, wherein as a response to said check command said control unit compares said character sequence provided by the user to some of all said corresponding character sequences stored in said storage means.

15. Use of the method of claim 1 in a mobile phone.

16. A telephone apparatus which includes:
    a control unit controlling its operation,
    storage means for storing phone numbers as character sequences, and
    means for delivering commands and character sequences provided by the user to said control unit wherein said telephone apparatus further comprises:
    means for delivering a check command from the user to said control unit,
    means for comparing a character sequence provided by the user to corresponding character sequences stored in said storage means as a response to said check command, and means for selecting for telephone connection establishment that character sequence among the compared character sequences stored in said storage means which best matches said character sequence delivered from the user to the telephone apparatus, and wherein, upon the occurrence of an error and in response to a command given by the user, said comparing means and said selecting means are operative to compare a recognized incorrect number to all numbers in storage means, said comparing means and selecting means being operative further to select a number in said storage means that best matches the recognized incorrect number.

17. The telephone apparatus of claim 16, further comprising means for recognizing speech.

18. The telephone apparatus of claim 17, further comprising means for recognizing continuously spoken digit sequences.

19. The telephone apparatus of claim 17, further comprising means for recognizing digit sequences spoken one digit at a time.

20. The telephone apparatus of claim 16, further comprising indication means to provide to the user information related to the call establishment.

21. The telephone apparatus of claim 20, further comprising means for producing a speech signal.

22. The telephone apparatus of claim 20, further comprising means for producing a digital signal.

23. The telephone apparatus of claim 16, further comprising means for automatically storing a phone number in said storage means when said telephone apparatus has a telephone connection to a telephone apparatus identified by the phone number in question.

24. The telephone apparatus of claim 16, further comprising means for storing a phone number in said storage means when no call is made through said telephone apparatus to a number in question.

25. A method for controlling a telephone apparatus which includes:

a control unit controlling its operation storage means for storing telephone numbers as stored character sequences, and means for delivering commands given by the user to said control unit, in which the user provides a calling character sequence to said telephone apparatus to identify an intended called party, the method comprising steps of:

entering a calling character sequence upon an entry command of the user, said telephone apparatus indicating an entered calling character sequence;

selecting whether to dial the intended called party using the entered calling character sequence, or to check the entered calling character sequence against the stored character sequences; and wherein said telephone apparatus provides for dialing a called party by using the entered calling character sequence upon a selection of dial command, and provides for comparing the number of the entered calling character sequence to said store telephone number upon a selection of check command.

26. A method according to claim 25 wherein, during said step of dialing, there is initiation of a step of checking to terminate the dialing of said dialing step.

27. A method according to claim 26 further comprising a step of storing a predetermined number of character sequences in said storage means.

28. A method according to claim 27 wherein, during said comparing step, said control unit compares said entered calling character sequence to character sequences of said stored character sequences stored in said storage means, and selects for telephone connection establishment a best-match character sequence among the compared character sequences stored in said storage means which best matches said character sequence delivered from the user to the telephone apparatus.

29. A method according to claim 28 further comprising a step of repeating said dialing using said best-match character sequence.

30. A method according to claim 29 wherein characters of said calling character sequence are numerals.

31. A telephone apparatus which includes:

a control unit controlling its operation, storage means for storing phone numbers as stored character sequences, and means for delivering commands and character sequences provided by the user to said control unit;

wherein said control unit is responsive to a dial command entered by the user for dialing an intended called party by use of an entered calling character sequence applied to said command delivering means, and is responsive to check a command for checking the entered calling character sequence by comparing the number of the entered calling character sequence to said stored numbers.

32. An apparatus according to claim 31 wherein said control unit is responsive to said check command, upon entry of said check command during a dialing of a called party, to terminate the dialing and to initiate checking the entered calling character sequence against the stored character sequences.

33. An apparatus according to claim 32 wherein, during said checking, said control unit compares said entered calling character sequence to individual ones of said stored character sequences stored in said storage means, and selects for telephone connection establishment a best-match character sequence among the compared character sequences stored in said storage means which best matches the entered calling character sequence delivered from the user to the telephone apparatus.

* * * * *